US005495577A

United States Patent [19]

Davis et al.

[11] Patent Number: 5,495,577

[45] Date of Patent: Feb. 27, 1996

[54] SYSTEM FOR DISPLAYING INSERTION TEXT BASED ON PREEXISTING TEXT DISPLAY CHARACTERISTICS

[75] Inventors: Mark E. Davis, Cupertino; Russell Sonnenschein, San Jose, both of Calif.

[73] Assignee: Taligent, Cupertino, Calif.

[21] Appl. No.: 500,022

[22] Filed: Jul. 10, 1995

Related U.S. Application Data

[63] Continuation of Ser. No. 43,161, Apr. 5, 1993, abandoned.

[51] Int. Cl.$^6$ .......... G06F 17/21

[52] U.S. Cl. .......... 395/144; 395/150; 395/151

[58] Field of Search .......... 395/144, 150, 395/151, 155–157, 159, 161, 425; 345/141, 143, 192–195

[56] References Cited

U.S. PATENT DOCUMENTS

| | | | |
|---|---|---|---|
| 4,493,080 | 8/1980 | Dysart et al. | 364/200 |
| 4,686,525 | 8/1987 | Nagata | 340/790 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,980,840 | 12/1990 | Yin | 564/518 |
| 5,001,697 | 3/1991 | Torres | 364/521 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,167,013 | 11/1992 | Hube et al. | 395/110 |
| 5,181,162 | 1/1993 | Smith et al. | 364/419 |
| 5,233,685 | 8/1993 | Landes et al. | 395/147 |
| 5,257,351 | 10/1993 | Leonard et al. | 395/150 |
| 5,339,392 | 8/1994 | Risberg et al. | 395/161 |

FOREIGN PATENT DOCUMENTS

| | | |
|---|---|---|
| 0203411 | 12/1986 | European Pat. Off. . |
| 0478339 | 4/1992 | European Pat. Off. . |

OTHER PUBLICATIONS

Dubnoff, "The System 7 Book", 1991, pp. 29, 136–138, 237–238.

Communications of the Association for Computing Machinery, vol. 28, No. 9, Sep. 1985, New York, NY, pp. 942–960, J. Gutknecht "Concepts of the Text Editor LARA".

IBM Technical Disclosure Bulletin, vol. 34, No. 11, Apr. 1992, Armonk, NY, pp. 336–337.

1990 IEEE International Conference on Systems, Man, and Cybernetics, 4 Nov. 1990, Los Angeles, Ca., pp. 499–504, M. Davis & L. Collins.

Computer. vol. 22, No. 9, Sep. 1989, Los Alamitos, Ca., pp. 11–28, J. Johnson et al., "The Xerox Star: A Retrospective".

Communications for the Associations for Computing Machinery, vol. 30, No. 7, Jul. 1987, New York, NY, pp. 600–610, J. D. Becker "Arabic Word Processing".

*Primary Examiner*—Heather R. Herndon
*Assistant Examiner*—Joseph H. Feild
*Attorney, Agent, or Firm*—Keith Stephens

[57] ABSTRACT

A method and system for automatically selecting a font so that a user sees the characters and fonts expected to appear in a document. The preferred embodiment of the invention employs a first process when a character, or string of characters, is entered into a text stream. If the character is missing from the font specified in the current typing style, the process selects a font that can display the character. For example, if the code for a "Σ" is inserted before "n/2" the process would automatically style the code with a font that could display the "Σ". Styling a character means that the character will always have a font style associated with the character.

19 Claims, 16 Drawing Sheets

| | | | | | | | | | | | | | | | | | |
|---|---|---|---|---|---|---|---|---|---|---|---|---|---|---|---|---|---|
| 400 | CODE | 0x039B | 0x03BF | 0x03B3 | 0x03BF | 0x03C2 | 0x0020 | 0x0049 | 0x006E | 0x0074 | 0x0065 | 0x0067 | 0x0072 | 0x0061 | 0x0074 | 0x0065 | 0x0064 |
| 410 | FONT | G | G | G | G | G | E | E | E | E | E | E | E | E | E | E | E |
| 420 | APPEARANCE | Λ | ο | γ | ο | ς | | I | n | t | e | g | r | a | t | e | d |
| 430 | STRING INDEX | 0 | 1 | 2 | 3 | 4 | 5 | 6 | 7 | 8 | 9 | 10 | 11 | 12 | 13 | 14 | 15 |

If we insert the string:

| | | | | | | | | | |
|---|---|---|---|---|---|---|---|---|---|
| 440 | 0x0020 | 0x03C4 | 0x03BF | 0x03BD | 0x0020 | 0x0398 | 0x03B5 | 0x03BF | 0x03BD |

FIG. 4

| CODE | 0x039B | 0x03BF | 0x03B3 | 0x03BF | 0x03C2 | 0x0020 | 0x0049 | 0x006E | 0x0074 | 0x0065 | 0x0067 | 0x0072 | 0x0061 | 0x0074 | 0x0065 | 0x0064 | 0x0020 | 0x03C4 | 0x03BF | 0x03BD | 0x0020 | 0x0398 | 0x03B5 | 0x03BF | 0x03BD |
|---|---|---|---|---|---|---|---|---|---|---|---|---|---|---|---|---|---|---|---|---|---|---|---|---|---|
| FONT | G | G | G | G | G | E | E | E | E | E | E | E | E | E | E | E | E | E | E | E | E | E | E | E | E |
| APPEARANCE | Λ | ο | γ | ο | ς | | I | n | t | e | g | r | a | t | e | d | | ? | ? | ? | | ? | ? | ? | ? |
| STRING INDEX | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| CODE | 0x39B | 0x3BF | 0x3B3 | 0x3BF | 0x3C2 | 0x20 | 0x49 | 0x6E | 0x74 | 0x65 | 0x67 | 0x72 | 0x61 | 0x74 | 0x65 | 0x64 | 0x20 | 0x3C4 | 0x3BF | 0x3BD | 0x20 | 0x398 | 0x3B5 | 0x3BF | 0x3BD |
|---|---|---|---|---|---|---|---|---|---|---|---|---|---|---|---|---|---|---|---|---|---|---|---|---|---|
| FONT | G | G | G | G | G | E | E | E | E | E | E | E | E | E | E | E | E | G | G | G | G | G | G | G | G |
| APPEARANCE | Λ | ο | γ | ο | ς | | I | n | t | e | g | r | a | t | e | d | | τ | ο | υ | | θ | ε | ο | υ |
| STRING INDEX | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| | | | | | | | |
|---|---|---|---|---|---|---|---|
| CODE | 0x039B | 0x03BF | 0x03B3 | 0x03BF | 0x03C2 | 0x0020 | 0x0050 |
| FONT | G | G | G | G | G | G | E |
| APPEARANCE | Λ | o | γ | o | ς | | P |
| STRING INDEX | 0 | 1 | 2 | 3 | 4 | 5 | 6 |

FIG. 8A

| | | | | | | |
|---|---|---|---|---|---|---|
| 0x039B | 0x03BF | 0x03B3 | 0x03BF | 0x03C2 | 0x0020 | 0x0050 |
| G | G | G | G | G | G | E |
| Λ | o | γ | o | ς | | P |
| 0 | 1 | 2 | 3 | 4 | 5 | 6 |

FIG. 8B

| | | | | | | | | | | | | | | | | | |
|---|---|---|---|---|---|---|---|---|---|---|---|---|---|---|---|---|---|
| 0x039B | 0x03BF | 0x03B3 | 0x03BF | 0x03C2 | 0x0020 | 0x0049 | 0x006E | 0x0074 | 0x0065 | 0x0067 | 0x0072 | 0x0061 | 0x0074 | 0x0065 | 0x0064 | 0x0020 | 0x0050 |
| G | G | G | G | G | E | E | E | E | E | E | E | E | E | E | E | E | E |
| Λ | o | γ | o | ς | | I | n | t | e | g | r | a | t | e | d | | P |
| 0 | 1 | 2 | 3 | 4 | 5 | 6 | 7 | 8 | 9 | 10 | 11 | 12 | 13 | 14 | 15 | 16 | 17 |

FIG. 8C

| CODE | 0x039B | 0x03BF | 0x03B3 | 0x03BF | 0x03C2 | 0x0020 | 0x03A0 |
|---|---|---|---|---|---|---|---|
| FONT | G | G | G | G | G | G | G |
| APPEARANCE | Λ | ο | γ | ο | ς | | Π |
| STRING INDEX | 0 | 1 | 2 | 3 | 4 | 5 | 6 |

FIG. 8D

| | | | | | | |
|---|---|---|---|---|---|---|
| 0x039B | 0x03BF | 0x03B3 | 0x03BF | 0x03C2 | 0x0020 | 0x03A0 |
| G | G | G | G | G | G | F |
| Λ | ο | γ | ο | ς | | Π |
| 0 | 1 | 2 | 3 | 4 | 5 | 6 |

FIG. 8E

| | | | | | | | | | | | | | | | | | |
|---|---|---|---|---|---|---|---|---|---|---|---|---|---|---|---|---|---|
| 0x039B | 0x03BF | 0x03B3 | 0x03BF | 0x03C2 | 0x0020 | 0x0049 | 0x006E | 0x0074 | 0x0065 | 0x0067 | 0x0072 | 0x0061 | 0x0074 | 0x0065 | 0x0064 | 0x0020 | 0x03A0 |
| G | G | G | G | G | E | E | E | E | E | E | E | E | E | E | E | E | E |
| Λ | ο | γ | ο | ς | | I | n | t | e | g | r | a | t | e | d | | π |
| 0 | 1 | 2 | 3 | 4 | 5 | 6 | 7 | 8 | 9 | 10 | 11 | 12 | 13 | 14 | 15 | 16 | 17 |

FIG. 8F

Here is a Greek sentence: "Εν αρχη ην ο Λογος, και ο Λογος ην προς τον Θεον, και Θεος ην ο Λογος."

FIG. 11

Here is a Greek sentence: "Εν αρχη ην ο Λογος, και ο Λογος ην προς τον Θεον, και Θεος ην ο Λογος."

FIG. 12

Here is a Greek sentence: "Εν αρχη ην ο Λογος, και ο Λογος ην προς τον Θεον, και Θεος ην ο Λογος."

FIG. 13

Here are five Greek words: Εν, αρχη, ην, ο, Λογος.

FIG. 14

Here are five Greek words: Εν, αρχη, ην, ο, Λογος.

FIG. 15

Here are five Greek words: Εν, αρχη, ην, ο, Λογος.

FIG. 16

Here are five Greek words: Εν, αρχη, ην, ο, Λογος.

FIG. 17

Here are five Greek words: Εν, αρχη, ην, ο, Λογος.

Here are five Greek words: En, arch, hn, o, LogoV.

FIG. 20

Here are five Greek words: ≈ﬁ, „Ÿ, ÿﬁ, Ô, ÃÔÁÔ÷.

FIG. 21

SYSTEM FOR DISPLAYING INSERTION TEXT BASED ON PREEXISTING TEXT DISPLAY CHARACTERISTICS

This is a continuation of application Ser. No. 08/043,161 filed Apr. 5, 1993 now abandoned.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATIONS

This patent application is related to the patent application entitled Object Oriented Framework System, by Debra L. Orton, David B. Goldsmith, Christopher P. Moeller, and Andrew G. Heninger, filed Dec. 23, 1992, and assigned to Taligent, the disclosure of which is hereby incorporated by reference.

This patent application is related to the patent application entitled FONT SELECTION SYSTEM, by Russell Sonnenschein, filed concurrently with this application, and assigned to Taligent, the disclosure of which is hereby incorporated by reference.

FIELD OF THE INVENTION

This invention generally relates to improvements in computer systems and more particularly to intelligently adding font styles as text is entered into a computer.

BACKGROUND OF THE INVENTION

Systems such as the Apple® Macintosh® or Microsoft® Windows (TM) overload the meaning of their character codes. For example the code 0×53 might represent the roman character 'S' or the Greek character 'S' depending upon the context. This overloading of character codes creates problems when clients need to edit text with multiple scripts and symbols. A script is a collection of character codes that have meanings that are semantically related. Usually a language maps into a single script. For example, encodings for Roman, Greek and Hebrew are all separate scripts.

Almost all commercial systems overload the semantics of their character encoding. Some systems do so with code page architectures, others do it simple by changing a font—which is similar to specifying a code page. Code pages are common to IBM systems. The context of a character depends upon the font or code page currently in use. Most systems can't even handle text from multiple scripts. Many that can, can only handle text in at most two scripts. Most systems also cannot detect, when a character is entered, if that character exists in the current font. Thus, someone might think that they were entering a 'Σ' but the character might display as a 'S' depending upon the current font. This is because the system cannot distinguish what a character's semantics is based solely on the character code. Some systems try to deal with the problem at the user interface level by associating a keyboard with a specific font. However, this type of solution does not work when characters are programmatically entered without the use of a keyboard.

There is another problem caused by the overloading of character codes. When a client tries to apply a font style to a string of characters from different scripts, the characters may become garbled. For example, text might contain a simple equation like "Σ n/2". A user might want to change the font on the text to something a little bolder looking like a Chicago font. The user would select the equation, change the font, and the result would look like "S n/2". The problem is even worse when the selection contains characters from many different scripts.

Both of these problems are inherent to systems that overload character codes. Systems that are based on an universal encoding, where all characters have unique codes, have the opportunity to work around these problems. However, to date, these systems have not effectively dealt with the problem. Systems that use universal character encoding, such as a system produced by Xerox, generally only indicates that a character is missing from the current font. For example, the sigma would display as a missing glyph rather than mapping it to some random glyph. A glyph is a visual representation of a character code. Prior art code page based systems would map the character to a random glyph.

SUMMARY OF THE INVENTION

Accordingly, it is a primary objective of the present invention to provide a system and method for automatically selecting a font so that a user sees the characters and fonts expected to appear in a document. The preferred embodiment of the invention employs a first process when a character, or string of characters, is entered into a text stream. If the character is missing from the font specified in the current typing style, the process selects a font that can display the character. For example, if the code for a "Σ" is inserted before "n/2" the process would automatically style the code with a font that could display the "Σ". Styling a character means that the character will always have a font style associated with the character.

BRIEF DESCRIPTION OF THE DRAWINGS

FIG. 4 illustrates an example of glyph insertion in accordance with the subject invention;

FIG. 5 illustrates an example of missing characters in accordance with the subject invention;

FIG. 6 illustrates an example of font processing in accordance with the subject invention;

FIGS. 8*a*, 8*b*, 8*c*, 8*d*, 8*e* and 8*f* are examples of typing style modification in accordance with the subject invention;

FIG. 11 is an example of a Greek sentence in accordance with the subject invention;

FIG. 12 is an example of applying the logic set forth in FIG. 10 to the Greek sentence in FIG. 11 in accordance with the subject invention;

FIG. 13 is an example of applying the logic set forth in FIG. 9 to the Greek sentence in FIG. 11 in accordance with the subject invention;

FIG. 14 sets forth five Greek words for an example in accordance with the subject invention;

FIG. 15 is an example of applying a Chicago font to the Greek words set forth in FIG. 14 in accordance with the subject invention;

FIG. 16 is an example of applying a Greek font to the Greek words set forth in FIG. 14 in accordance with the subject invention;

FIG. 17 is an example of applying a Courier font to the Greek words set forth in FIG. 14 in accordance with the subject invention;

FIG. 18 is an example of applying a Zapf Dingbats font to the Greek words set forth in FIG. 14 in accordance with the subject invention;

FIG. 19 is an example of applying a Zapf Dingbats font to the Greek words using a prior art system;

FIG. 20 is an example of applying a Courier font to the Greek words using a prior art system; and FIG. 21 is an example of applying a Courier font to Hebrew on a Macintosh prior art computer system.

DETAILED DESCRIPTION OF THE INVENTION

Figure 1:
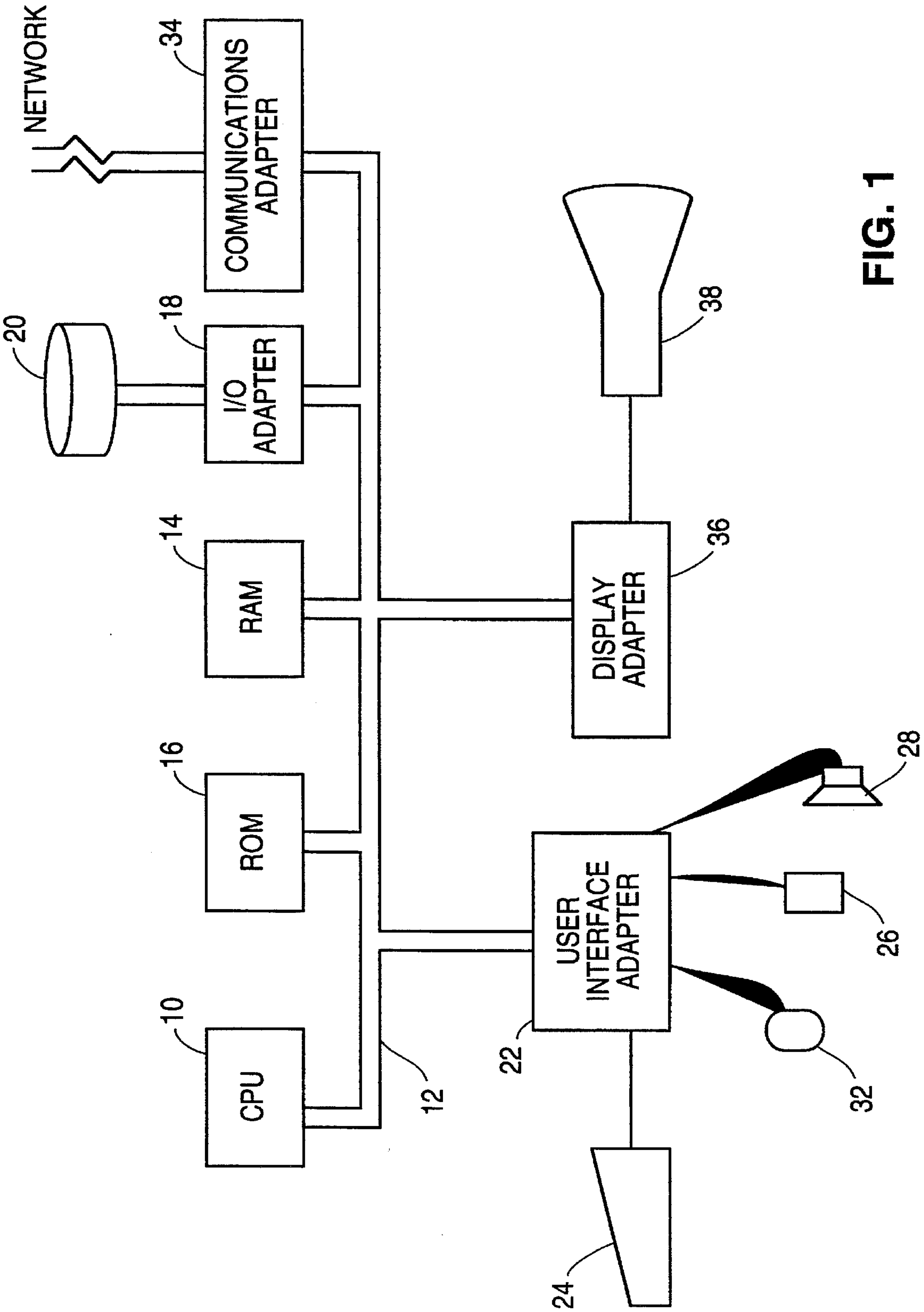
FIG. 1 is a block diagram of a personal computer system in accordance with the subject invention.

A preferred embodiment of the invention is practiced in the context of an operating system resident on a personal computer such as the IBM® PS/2® or Apple® Macintosh® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7® operating system.

A preferred embodiment employs two processes, used by the text subsystem, to manipulate character codes and font styles. The first process intelligently adds font styles to characters upon text entry. The second process applies font styles to a selection containing characters from multiple scripts.

As mentioned before, systems such as the Apple® Macintosh® overload the meaning of their character codes. For example the code 0×53 might represent the roman character 'S' or the Greek character 'Σ' depending upon the context. This overloading of character codes creates problems when clients need to edit text with multiple scripts and symbols. The context of a character depends upon the font or code page currently in use.

Most systems cannot detect, when a character is entered, if that character exists in the current font. Thus, someone might think that they were entering a 'Σ' but the character might display as a 'S' depending upon the current font. This is because the system cannot distinguish what a character's semantics is based solely by examining the character code. Some systems try to deal with the problem at the user interface level by associating a keyboard with a specific font. However, this type of solution is impossible when characters are programmatically entered without a keyboard.

There is another problem caused by the overloading of character codes. When a client tries to apply a font style to a string of characters from different scripts, the characters may become garbled. For example, text might contain a simple equation like "Σ n/2". A user might desire to change the font on the text to something a little bolder looking, for example, a Chicago font. The user would select the equation, change the font, and the result would look like "S n/2". The problem is even worse when the selection contains characters from many different scripts.

Both of these problems are inherent to systems that overload character codes. Systems that are based on a universal encoding, where all characters have unique codes, have the opportunity to work around these problems. However, to date these systems have not effectively dealt with the problem.

Systems that use universal character encoding, such as a system produced by Xerox, only indicate that a character is missing from the current font. For example, a sigma would display as a missing glyph rather than mapping to a random glyph.

A preferred embodiment employs two sets of processes, one for text entry and one for applying font styles to a text selection. A font style is just a symbolic reference to a font. All the functionality of a font is available through a font style. This processing eliminates problems experienced in other systems. By combining these processes, a user always sees the character that he expected to see, in the font he expected to see it in.

The first process is used when a character, or string of characters, is entered into a text stream. If the character is missing from the font specified in the current typing style the process will choose a font that can display the character. For example, if the code for a "Σ" is inserted before "n/2" the process would automatically style the code with a font that s could display the "Σ."

The second process is used when a client applies a font style change to a range of characters. The process intelligently applies the font to the selection. For example, applying a preferred embodiment of the invention, Chicago font to the characters "Σ n/2" would produce "Σ n/2".

Both of the processes can be used by code page based systems if:

- they have the ability to track the code page with their character codes,
- their systems can handle characters from multiple code pages within a single stream of text, and
- they have the ability to detect if a character is missing.

In practice, it is more difficult, but not impossible, for code page based systems to use a process like the series described below. The reason why it is harder for code page based system to make use of these processes is that they usually have one or more of the following restrictions that complicate their situation:

they can only handle a single code page at a time, they overlap characters within a single code page, they can't detect if a character is missing from a font or, they map the same character to multiple code pages.

That is why these processes are of more use to systems that use a universal character encoding such as Unicode. The process behaves the same if it is invoked once with all the input text, or if it is called repeatedly with successive pieces of all the text.

Changing The Typing Font For Text Input

Figure 2A:
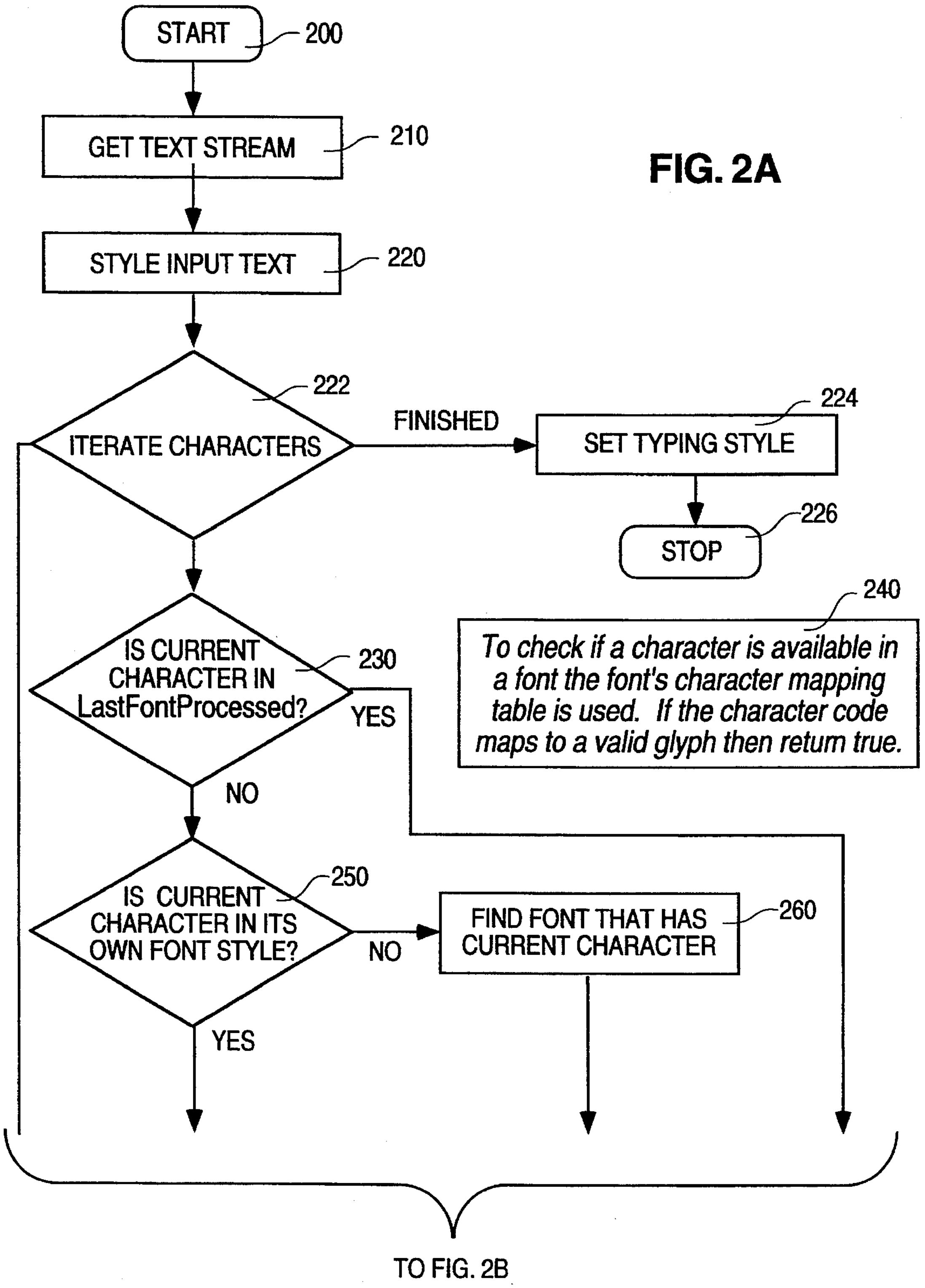
FIGS. 2A–2B set forth the logic for automatically styling a character with a new font style when the current font cannot display the character in accordance with the subject invention.
Figure 2B:
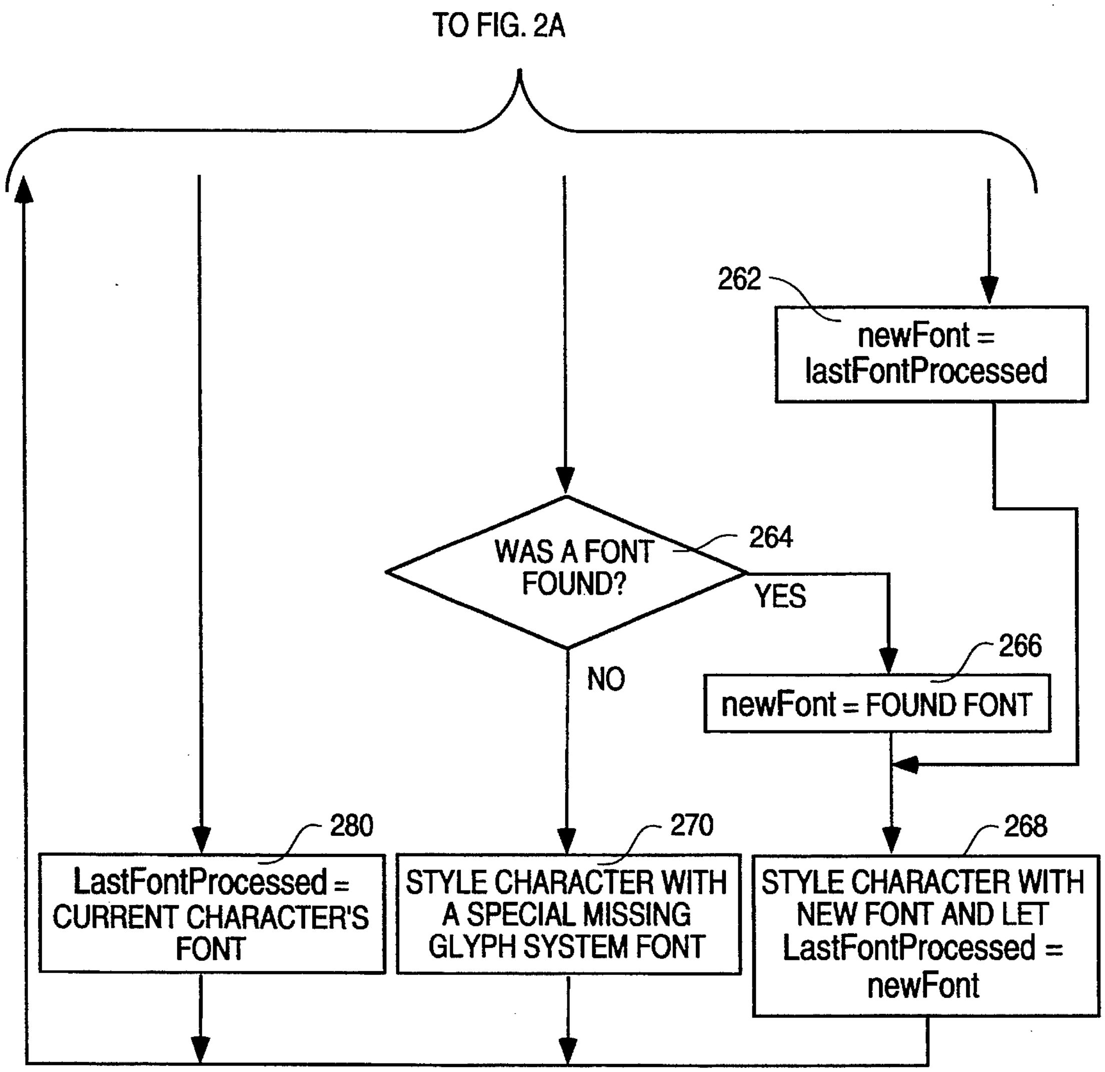

The logic set forth in FIG. 2 automatically styles a character with a new font style when the current font cannot display the character. The process iterates on the input text to determine if the font associated with the current character can display that character. If not, it tries to find a font that can. The process then tries to keep all subsequent characters of the input text in the same font.

Figure 3:
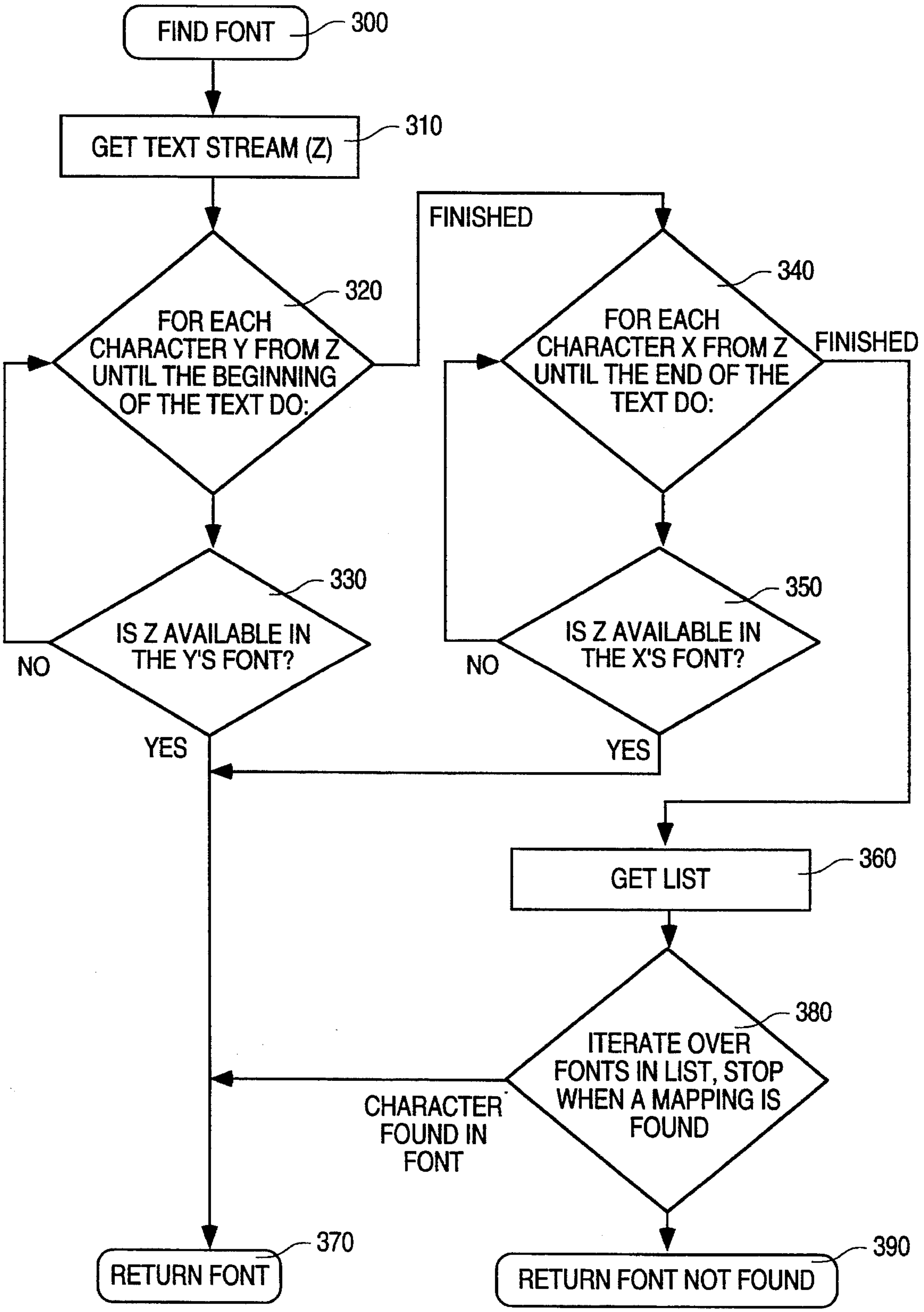
FIG. 3 is a flowchart of the logic for finding a font that matches in accordance with the subject invention.

With reference to FIG. 3, to find a font that can display the current character, the process parses all the previous characters in the text stream and then parses all subsequent characters until a font referenced by one of those characters can display the current character. If no font is found, the system searches all the available fonts on the system (in a sorted order either specified by a user preference or by a stylistic matching process).

Every character in a text stream has a font style associated with it. Usually the font style will initially be set from a typing style, but it may also be set by another means. Characters can have a NIL style which is similar to a font that cannot display any characters. Second, the processes refer to a special missing glyph font. This is a special font that is used for character substitution purposes only—when no other font can display a character. In a preferred embodiment, this font will map the characters in an entire script range to a single glyph. For example, all Cyrillic characters might display as a backwards R (the Cyrillic letter IA).

Processing commences in FIG. 2 at terminal 200 and immediately passes to function block 210 to obtain the text input and identify the insertion point for the new text. Then, at function block 220, the input text is styled and inserted into the text string at the insertion point. At decision block 222, all the inserted characters are processed until insertion processing is completed. When insertion processing is completed, then the typing style is equated with the font style of the last character processed at function block 224 and processing is completed at terminal 226. Iteration of inserted characters is processed in the loop commenced at decision block 230 where a test is performed to determine if the current character is in the last font processed set. As set forth in function block 240, this processing attempts to map the character code to a valid glyph and returns true if a valid glyph exists. If a valid glyph is obtained, then newfont is equated to lastfontprocessed in function block 262, the current character is styled with the newfont, lastfontprocessed is set equal to newfont, and processing is passed to decision block 222 to determine if all insertion characters have been processed.

If a valid glyph is not detected at decision block 230, then a further test is performed at decision block 250 to determine if the current character is in the character's own font style. If so, then lastfontprocessed is set equal to the current character's font and control is passed to decision block 222 to determine if additional characters are available for insertion. If the current character is not in the character's own font style at decision block 250, then a font must be found using the logic set forth in FIG. 3. Then, a test is performed at decision block 264 to determine if a font was found. If no font was located, then the character is styled with a predefined missing glyph system font and control is passed to decision block 222 if additional characters are to be inserted. If a font was located at decision block 264, then control passes to function block 266 to set newfont equal to found font, style the current character with the new font, set lastfontprocessed equal to newfont at function block 268, and return control to decision block 222 to determine if additional characters remain to be processed.

FIG. 3 sets ,forth the detailed logic for finding a font in accordance with the subject invention. Processing commences at function block 310 where the text stream is obtained and a pointer to the initial character is identified. Then, at decision block 320, each character y from the initial character to the beginning of the text is checked and a determination is made at decision block 330 to determine if the character is available in the y's font. If the character is available, then the font is returned at terminal 370. If the character is not available, then decision block 320 is executed to determine if additional characters remain for processing. When all characters have been processed backward, then another loop is commenced at decision block 340 for each character x from z until the end of the text to determine at decision block 350 if z is available in x's font. If a font is available, then the font is returned at terminal 370. If not, then the next character is processed at decision block 340 until all characters are processed. Then, at function block 360, a list of fonts is created and at decision block 380, the current character is checked against each font in the list to attempt to identify a mapping. If a mapping is obtained, then the font is returned via terminal 370. If no mapping is obtained, then font not found is returned via terminal 390.

FIGS. 4, 5 and 6 illustrate examples to further illuminate the processing set forth in FIGS. 2 and 3. Lets assume that we have two fonts:

Font 'G' has glyphs for all characters in the range 0×370 . . . 0×3 FF and for character 0×020.

Font 'E' has glyphs for all characters in the range 0×000 . . . 0×0 FF. Notice both fonts can map character 0×20.

Given the code string 400, font 410, appearance 420, and string index 430 as shown FIG. 4, if the new string 440 is inserted after the character at index 15, without using the process, the new characters will adopt the font style 'E'. The resulting string would look like the string shown in FIG. 5.

This processing will result in a string displaying missing characters (question Marks in this example) 500 for everything except for occurrences of the code for spaces—code 0×20. Systems that overlap code pages will usually show random characters from another code page instead of question marks. For example, a Macintosh computer would display characters 16 . . . 24 as "ton Qeon" instead of how the characters look ("τον Θεον") Applying the process to the string will give the following desired result in the string illustrated in FIG. 6 at label 600.

The interesting thing to note is that the first 0×20 remained in font 'E', but that the second 0×20 was changed to font 'G'. The process has the desirable feature that once a switch is made to a new font, that all subsequent characters are styled with the new font if it is possible to do so.

Figure 7A:
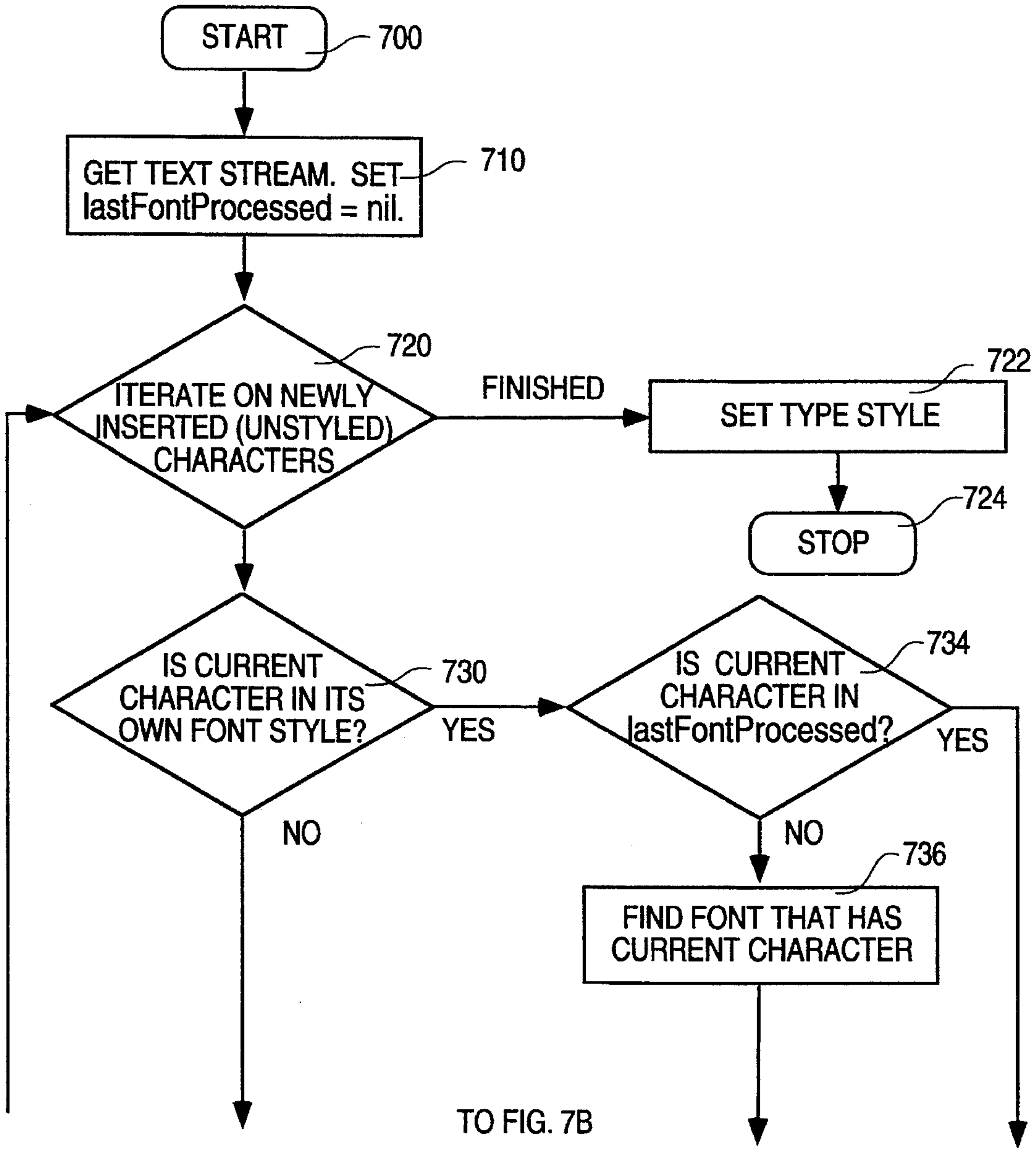
FIGS. 7A–7B constitute a flowchart of glyph processing in accordance with the subject invention.
Figure 7B:
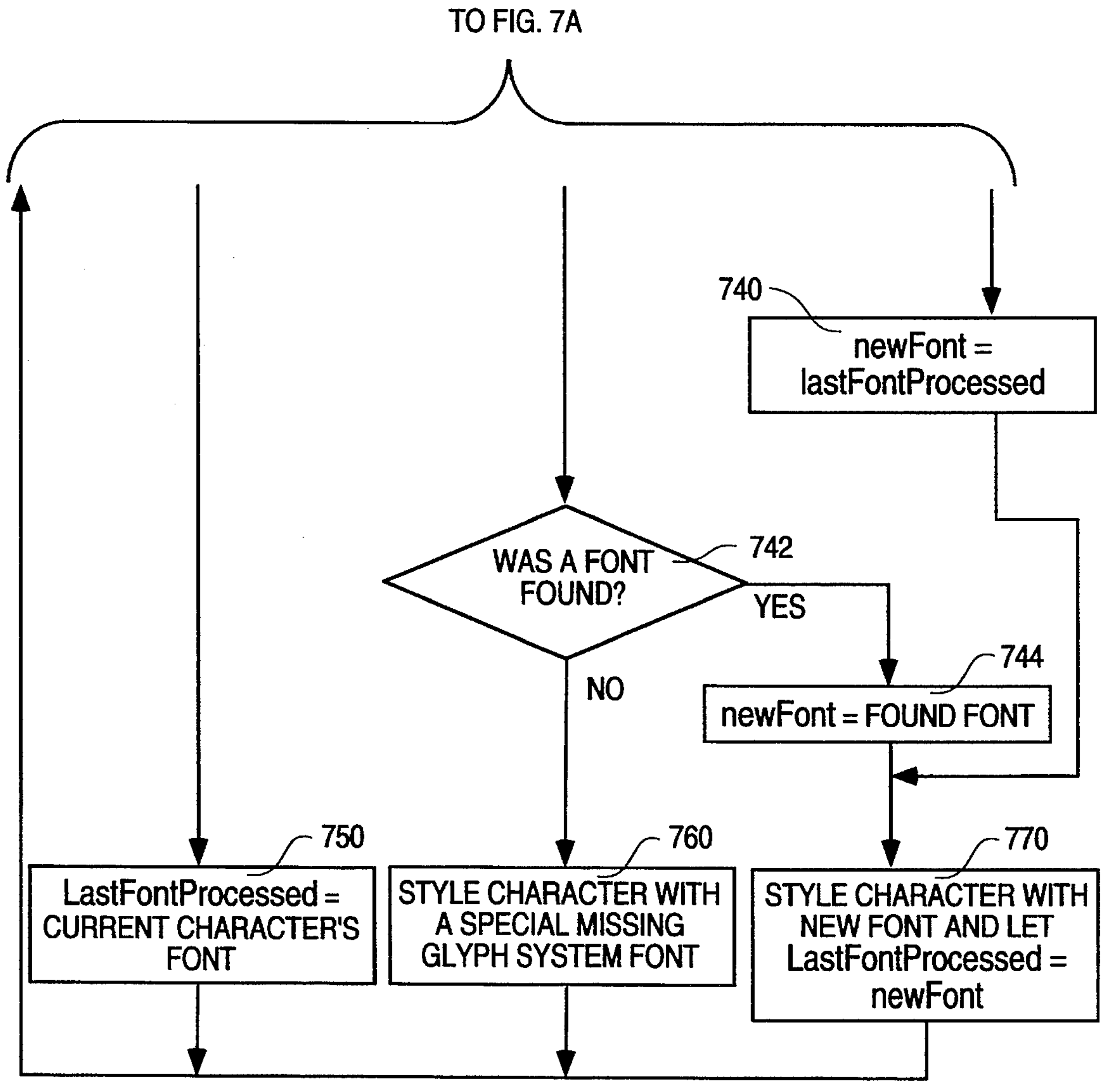

A slight modification of the above process is illustrated in the flowchart appearing in FIG. 7. When a client wants to fix missing glyph characters in text that already has font styles the logic shown in FIG. 7 is employed. The major difference with this process is that the process first checks if a character can be displayed in it's own font style before it checks if it can display in the previously processed font style. The effect of this process on characters that can be displayed in their current font is that they are left unchanged. For instance, this process could be used when transferring text between systems which have different font configurations.

Processing commences at terminal 700 and passes immediately to function block 710 to get the text string, text to be input, the insertion point where the input text will be added, and to set lastFontProcessed equal to a nil character. Then, at decision block 720, a loop is commenced to iterate on each of the newly inserted characters until all characters are processed. When all characters have been processed, then the typing style is set equal to the font style of the last character processed at function block 722 and processing is completed at terminal 724.

If characters remain to be processed, then at decision block 730, a test is performed to determine if the current character is in the character's own font style. If so, then lastFontProcessed is set equal to the current characters font at function block 750 and control is returned to decision block 720 to process the next character. If not, then at decision block 734 a test is performed to determine if the current character is in the lastFontProcessed. If so, then newFont is set equal to lastFontProcessed at function block 740, the current character is styled with the new font, lastFontProcessed is set equal to newFont at function block 770, and control is returned to decision block 720 to process the next character.

If the current character is not in the lastFontProcessed, then at function block 736 a font is located that has the current character, and a test is performed at decision block 742 to determine if a font was located. If a font was located, then newFont is set equal to found font, the current character is styled with the new font, lastFontProcessed is set equal to newFont at function block 770, and control is returned to decision block 720 to process the next character. If a font was not found at decision block 742, then the character is styled with a special missing glyph system font as shown in function block 760 and control is returned to decision block 720 for further character processing.

Changing The Typing Font While Transliterating

The processing set forth in FIG. 2 can run into a problem when two fonts share some characters, and text is being transliterated. The problem is best demonstrated by example.

Suppose you type the Greek word "Λογοζ" and then the characters "P". The String would now look like: "Λογοζ P" where P would be styled with the Bookman font and the rest of the string in a Greek font. Also, assume the system had a transliterator that turned 'Pi' into 'Π' and both fonts could display the Greek Pi character. If the user then types an 'i' the resulting string would look like: "Λογοζ π". Notice that the pi character has the Bookman font style rather than the Greek font style. A more desirable result would display a Pi character in the Greek font (so that it looks like: "Λογοζ Π").

To accomplish this we have to add the following extra logic to a typing style and the transliteration software:

When the typing style is explicitly changed by the user, the current typing style must retain a copy of the new typing style that is access only by the transliterator software—this copy is referred to as the explicit typing style. When the process described above with reference to FIG. 2 changes the typing style, this change does not effect the explicit typing style.

A transliterator must do the following when it replaces text:

If the character preceding the replaced characters is not styled with the same font as the current typing style then reset the typing style to the explicit typing style.

This processing handles the following cases:

Suppose we have two Greek fonts (G and F) and one Roman font (E). Also, assume we have a transliterator that maps the 'Pi' characters into a 'Π' character.

Now suppose we have the strings set forth in FIGS. **8*a*, 8*b* and 8*c*. Also assume that the user explicitly changed the font in the typing style to font F before typing the 'P' in the second string, as illustrated in FIG. 8*b*. When the user types an 'i' after the 'P' in all three strings, the strings will appear as shown in FIGS. 8*d*, 8*e* and 8*f***. In all three cases this is the result that a user would have expected.

Applying a Font Style to a Selection

When applying a font style change to a range of characters, clients would like a system to only apply the font style to the characters that the font is able to display. The process in FIG. 9 does precisely this. The process commences at function block 910 where a reference is obtained to the font style to be applied, a styled text stream and a range or selection on the text stream onto which the fontStyle is to be set. Then, at decision block 920, a loop is commenced to process the appropriate portion of the text stream from the startIndex to the stopIndex. When the stopindex's character has been processed, then processing is completed as indicated at terminal 930. If additional characters remain, then at decision block 940 a test is performed to determine if the current character being processed is in the fontStyle. If so, then the fontStyle is set on the character and control is passed to decision block 920 to process the next character. If the character being processed is not in the fontStyle, then control is returned to decision block 920 to process the next character.

Figure 10A:
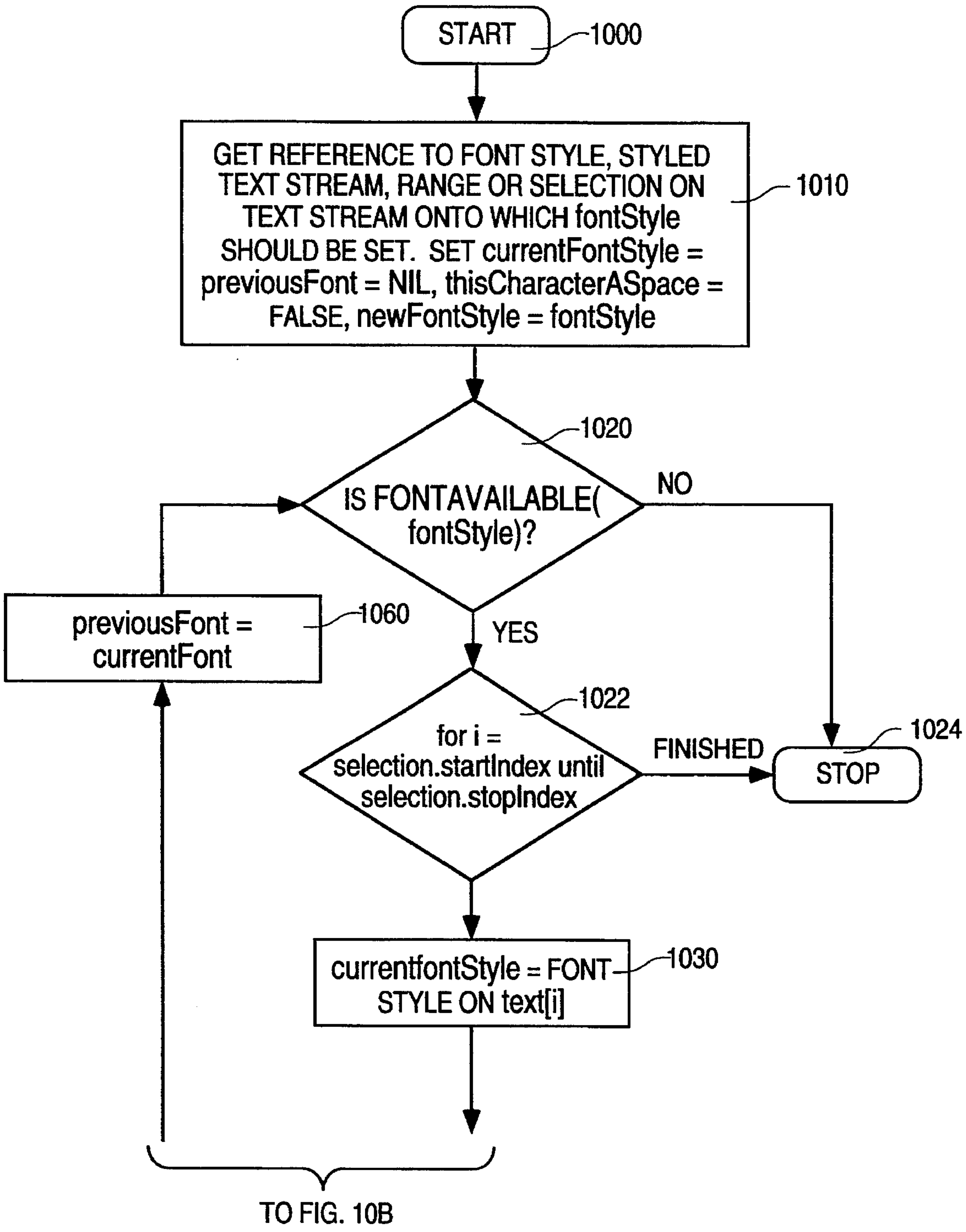
FIGS. 10A–10C constitute another flowchart of s alternative logic for setting a font on a text selection in accordance with the subject invention.
Figure 10B:
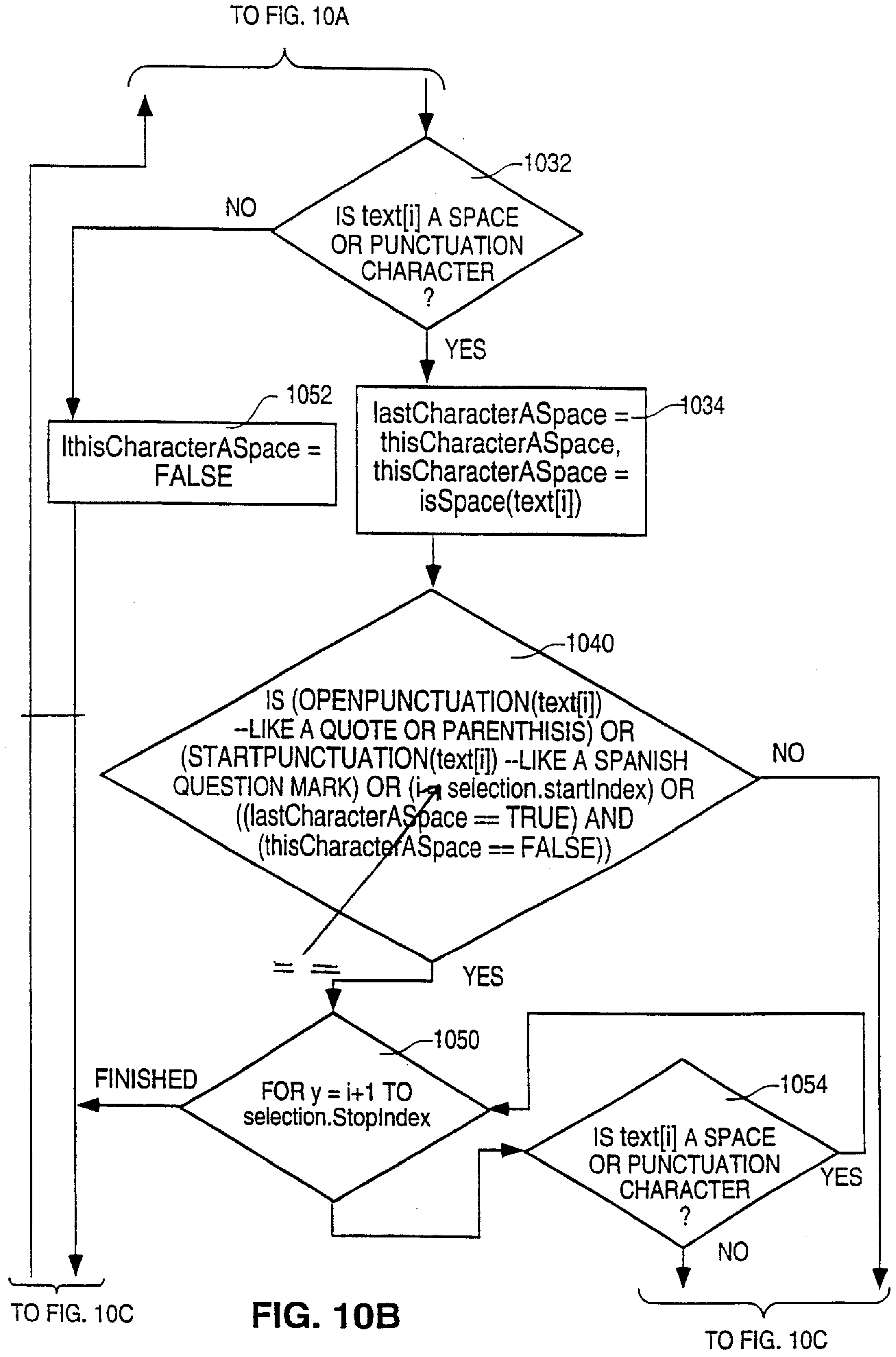
Figure 10C:
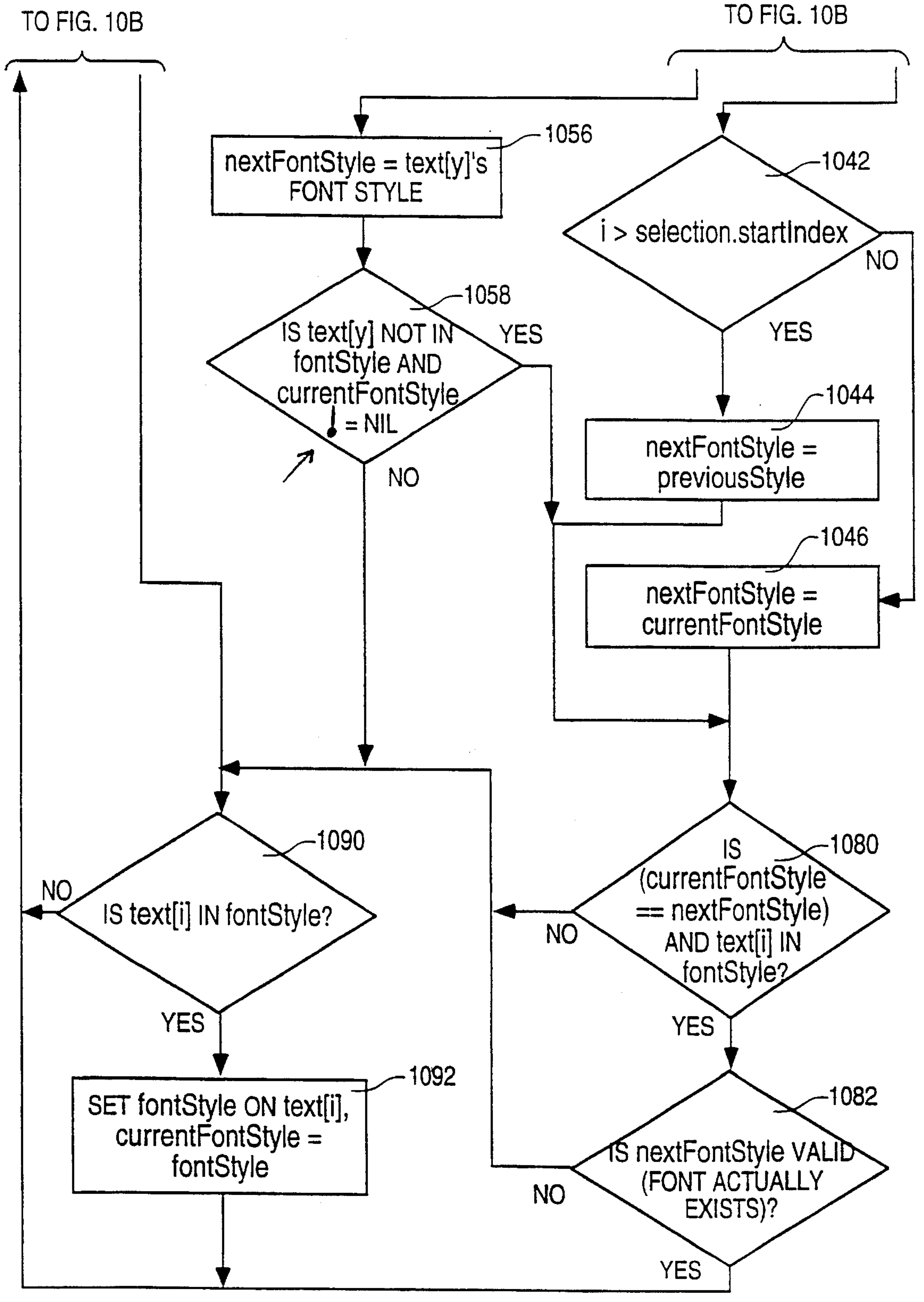

The processing set forth in FIG. 10 is more complex in that it tries to keep all surrounding spaces and punctuation (including quotes, commas, periods . . . ) in the same font as the surrounding letters. In practice, this processing produces a more pleasant result—a result that was the desired result of the font designer. Furthermore, this processing prevents font styles from alternating back and forth between every word and space. This switching can cause performance problems on many systems.

Processing commences at function block 1010 where a reference is obtained to the font style to be applied, a styled text stream and a range or selection on the text stream onto which the fontstyle should be set. Also, the current font style is set equal to nil, this Character A Space is set equal to false, and newFontStyle is set equal to fontStyle. Then, at decision block 1020, a test is performed to determine if the fontstyle of the current character is available. If not, then processing is completed at terminal 1024. If so, then a test is performed at decision block 1022 to determine if all stopindex has been reached. If so, then processing is completed at terminal 1024. If not, then currentfontstyle is equated to the fontstyle of the character currently being processed in the text stream as depicted in function block 1030. Then, at decision block 1032, another test is performed to determine if the character currently being processed in the text string is a space or punctuation character. If so, then lastcharacterspace is equated to thischaracterspace in function block 1034.

At decision block 1040, a further test is performed to determine if the current character is a special character. If so, then a loop is commenced at decision block 1050 to if the character is a space or a punctuation character. If so, then the next character is processed at decision block 1050. If not, then nextFontStyle is equated to the character's font style at function block 1056, a test is performed at decision block 1058 to determine if the character is not in fontstyle and if the current font style is a nil character. If so, then a further test is performed at decision block 1080 to ascertain if the, current font style is the same as the next font style and if the current character is in font style. If so, then a final test is performed to determine if the font actually exists on the system al decision block 1082. If it exists, then previous font is equated to current font at function block 1060 and the next character is processed at decision block 1022.

If the current character does exist in font style or the current font style is not a nil character, then a test is performed at decision block 1090 to determine if the character is in fontstyle. If so, then the character's fontstyle is set, the current font style is equated with font style, previous font is equated to current font, and the next character is selected at decision block 1022. If the current character is not in the font style, then previous font is equated to current font at function block 1060 and control is passed to decision block 1022 to process the next character.

If the current character is not a space or punctuation character as determined at decision block 1032, then thisCharacterASpace is set to false, and control passes to decision block 1090 for processing as discussed above.

If no special character is detected at decision block 1040, then a further test is performed at decision block 1042 to determine if the first character is being processed. If not, then nextFontStyle is equated to previousStyle at function block 1044 and control is passed to decision block 1080 for processing as discussed above. If the first character is being processed, s then nextFontStyle is equated to currentFontStyle and control is passed to decision block 1080 for processing as discussed above. The smart process presented in FIG. 10 works by parsing the text and applying the new font styles to characters that the font is able to display.

Spaces and punctuation are treated as special characters, and the process peeks ahead to the first non-space or non-punctuation character to check if that character is in the same font as the space or punctuation character. It also checks if the font can display the non-space or non-punctuation character. Using this information the process decides if it wants to apply the font style change to the space or punctuation character.

It is important to notice that the process works on a selection. if a selection contains only spaces and punctuation the process will change the font on the characters regardless of the font of the surrounding characters—assuming the font can display the characters.

FIGS. 11 to 21 are examples of the processing that transpires on typical multi-script text. The first example, set forth in FIG. 11, illustrates a Greek sentence. If all the text is selected and the Courier font style is applied, the processing will produce the result illustrated in FIG. 12. The important thing to notice is that the quotes, period, spaces and commas in the Greek portion are kept in the Greek font. This even includes the trailing punctuation at the end of the sentence.

Figure 9:
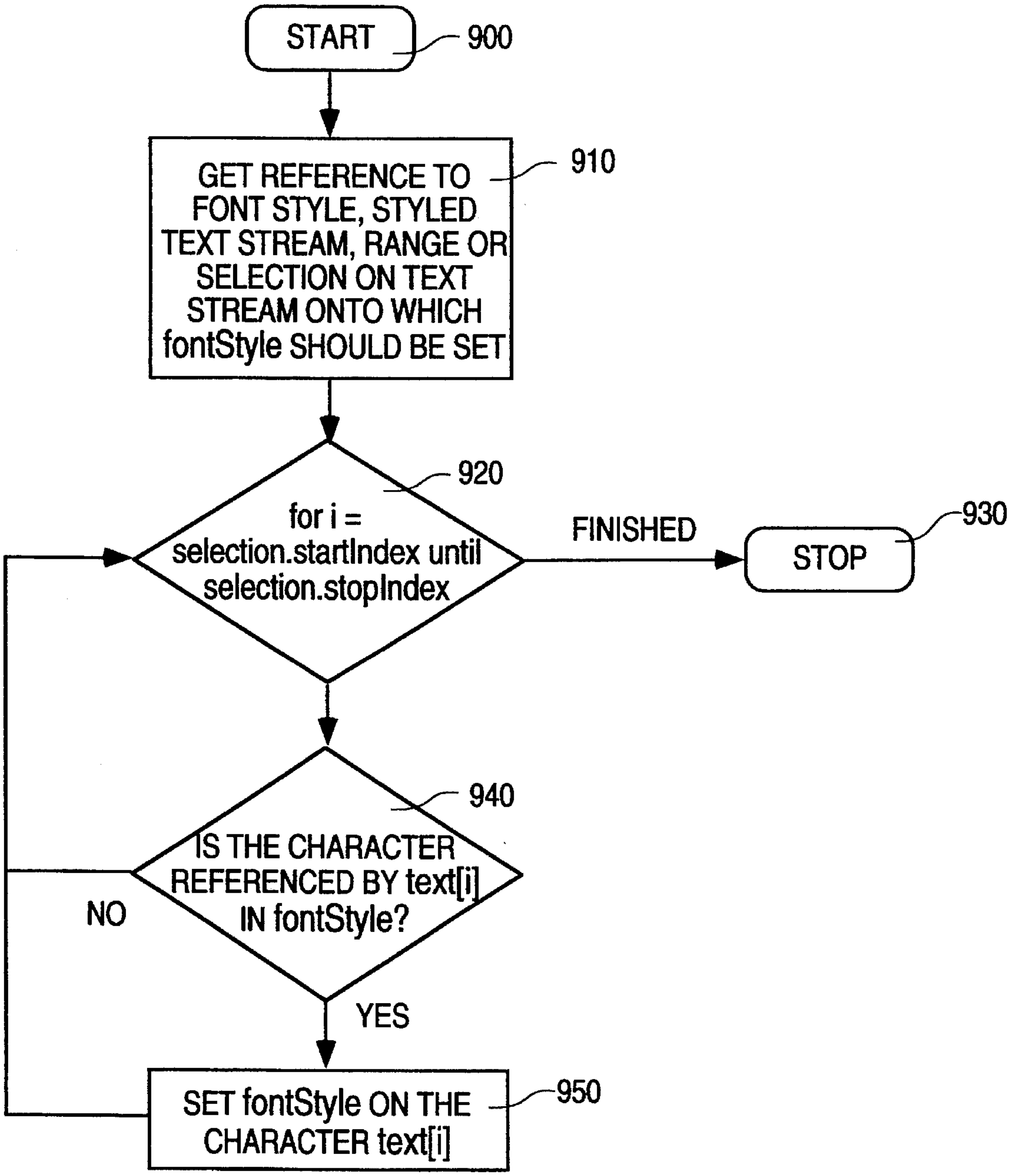
FIG. 9 is a flowchart of the logic for setting a font on a text selection in accordance with the subject invention.

Had we just mapped the characters using the simple processing set forth in FIG. 9, the resulting text would appear as set forth in FIG. 13.

A second example is set forth regarding the five Greek words illustrated in FIG. 14. Note that all the spaces, commas and period use the Courier font. If all the text is selected and the Chicago font is applied, the processing in accordance with an embodiment of the invention will produce the result set forth in FIG. 15. Notice that the spaces, commas, and period changed to Chicago. This is because the processing is sensitive to the fact that the font of these characters was different from that of the surrounding characters. Applying the Greek font to the result from the last example produces the text illustrated in FIG. 16. Notice that only the commas, period, and the spaces between the Greek words changed to the Greek font.

Finally, applying Courier to the sentence above produces the words set forth in FIG. 17. Notice that the commas, period, and spaces between the Greek words remain in the Greek font. This is because the process is sensitive to the fact that these characters were styled with the same font as the Greek text. The other thing to notice in all these examples is that the colon always stayed in the same font as the Roman text while the other punctuation behaved differently depending upon their font styles.

Now for examples that may be more familiar to computer users. If we apply the font Zapf Dingbats to the above line, the process will not alter the line. It will still display as shown in FIG. 18. However applying Zapf Dingbats using most commercial, prior art, systems will produce the text set forth in FIG. 19. Applying Courier to the above sentence using most products on the market today will produce the text presented in FIG. 20. This is not a very useful result. Had this sentence been Hebrew, it would have looked something like the text shown in FIG. 21 on the Apple Macintosh computer using prior art techniques. Greek happens to look slightly more readable, but it is still garbage, because on many systems the Greek character codes happen to share the same character codes as the Roman phonetic equivalents.

The preferred embodiment set forth in this invention, at first glance, might not seem impressive. This is precisely because they produce the results that user's desire. What is amazing is that users today put up with systems that are so hard to work with. The system and method presented are all truly unique in that nobody uses anything like them in today's systems. Today's systems put the burden upon the user to get their text looking correct. Users have to put up with the fact that they don't always see what they type in, or when they change fonts their text is changed into characters not intended.

As computer systems become more global, and target non-Roman markets, the importance of the subject invention increases. Most manufactures have only recently started thinking about producing global system. Which implies supporting Roman based languages only. As non-Roman markets become more influential, and as bi-lingual and multi-lingual documents become more common, users will demand more from their computers.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A computer system with a storage for storing a text string comprised of a plurality of characters each having a character code, and a display for displaying each character in said plurality of characters in a font selected from a plurality of fonts stored in said storage in an indexed font table containing glyphs for each of said plurality of fonts, said system comprising:

(a) means for selecting a first font from said plurality of fonts stored in said storage;

(b) means for inputting into said computer a character code representative of a particular character to be inserted into said text string at an insertion point;

(c) means for determining if said character code is defined in said first font by accessing said indexed font table utilizing said character code as an index to determine if there is a first associated glyph for said character code, and if a first associated glyph is found, then displaying said particular character in said first font by displaying said first associated glyph on said display;

(d) means for selecting other fonts in said ordered font table which other fonts are used to display at least one of said plurality of characters in said text string if said particular character does not have a first associated glyph in said first font;

(e) utilizing said character code as an index to determine if there is a second associated glyph in said ordered font table for said other fonts, and if a second associated glyph is found, then displaying said particular character by displaying said second associated glyph on said display; and (f) displaying a predetermined third glyph from a default font if a second associated glyph is not found.

2. The system as recited in claim 1, including means for initiating said selecting a first font through an iconic operation utilizing a cursor positionzing device.

3. The system as recited in claim 2, including processing means for initiating said selecting a first font by dropping a first icon onto a second icon.

4. The system as recited in claim 1, wherein said means for selecting other fonts comprises:

means for selecting a test character from said plurality of characters in said text string which test character precedes said insertion point;

means responsive to said test character for selecting a second font from said plurality of fonts stored in said storage, which second font is used to display said test character;

means for determining if said particular character can be displayed in said second font by searching said ordered font table utilizing said character code as an index to determine if there is a second associated glyph for said second font, and if an associated glyph is found, then displaying said particular character in said second font by displaying said second associated glyph on said display; and means for selecting a second test character from said plurality of characters in said text string which second test character precedes said insertion point if said character does not have an associated glyph in said second font, and selecting a third font used to display said second test character.

5. The system as recited in claim 1, including a parser to parse the text.

6. The system as recited in claim 1, including a processor for processing special characters.

7. The system as recited in claim 6, including means for displaying a user selectable option for special character processing on said display.

8. The system as recited in claim 7, wherein said means for selecting other fonts comprises:

means for selecting a third test character from said plurality of characters in said text string which third test character follows said insertion point;

means responsive to said third test character for selecting a second font from said plurality of fonts stored in said storage, which second font is used to display said third test character;

means for determining if said particular character can be displayed in said second font by searching said ordered font table utilizing said character code as an index to determine if there is a second associated glyph for said second font, and if an associated glyph is found, then displaying said particular character in said second font by displaying said second associated glyph on said display; and means for selecting a fourth test character from said plurality of characters in said text string which fourth test character follows said insertion point if said particular character does not have an associated glyph in said second font, and selecting a third font used to display, said fourth test character.

9. The system as recited in claim 6, including a storage for storing character codes associated with special characters.

10. A method for processing text on a computer with a storage for storing a text string comprised of a plurality of characters each having a character code, and a display for displaying each character in said plurality of characters in a font selected from a plurality of fonts stored in said storage in an indexed font table containing glyphs for each of said plurality of fonts, said method comprising the steps of:

(a) selecting a first font from said plurality of fonts stored in said storage;

(b) inputting into said computer a character code representative of a particular character to be inserted into said text string at an insertion point;

(c) determining if said character code is defined in said first font by accessing said indexed font table utilizing said character code as an index to determine if there is a first associated glyph for said first font, and if a first associated glyph is found, then displaying said particular character in said first font by displaying said first associated glyph on said display;

(d) selecting other fonts in said ordered font table which other fonts are used to display at least one of said plurality of characters in said text string if said particular character does not have a first associated glyph in said first font;

(e) utilizing said character code as an index to determine if there is a second associated glyph in said ordered font table for said other fonts and if a second associated glyph is found, then displaying said particular character by displaying said second associated glyph on said display; and (f) displaying a predetermined third glyph from a default font if a second associated glyph is not found.

11. The system as recited in claim 10, including the step of initiating said selecting a first font through an iconic operation utilizing a cursor positioning device.

12. The method as recited in claim 11, including the step of initiating said selecting a first font by dropping a first icon onto a second icon.

13. The method as recited in claim 10, wherein step (d) comprises the steps of:

(d1) selecting a test character from said plurality of characters in said text string which test character precedes said insertion point;

(d2) selecting a second font from said plurality of fonts stored in said storage, which second font is used to display said test character;

(d3) determining if said particular character can be displayed in said second font by searching said ordered font table utilizing said character code as an index to determine if there is a second associated glyph for said second font, and if a second associated glyph is found, then displaying said particular character in said second font by displaying said second associated glyph on said display; and (d4) selecting another test character from said plurality of characters in said text string which other test character precedes said insertion point if said particular character does not have an associated glyph in said second font, and repeating steps (d1) to (d3) for said other test character until all characters preceding the insertion point have been tested.

14. The method as recited in claim 10, including the step of parsing the text.

15. The method as recited in claim 10, including the step of processing special characters.

16. The method as recited in claim 15, including the step of displaying a user selectable option for special character processing on said display.

17. The method as recited in claim 16, wherein step (d) further comprises the steps of:

(d5) selecting a third test character from said plurality of characters in said text string which third test character follows said insertion point;

(d6) selecting a second font from said plurality of fonts stored in said storage, which second font is used to display said third test character;

(d7) determining if said particular character can be displayed in said second font by searching said ordered font table utilizing said character code as an index to determine if there is a second associated glyph for said second font, and if an associated glyph is found, then displaying said particular character in said second font by displaying said second associated glyph on said display; and (d8) selecting another test character from said plurality of characters in said text string which other test character follows said insertion point if said particular character does not have an associated glyph in said second font, and repeating steps (d5) to (d7) for said other test character until all characters following the insertion point have been tested.

18. The method as recited in claim 15, including the step of storing character codes associated with special characters.

19. A method for processing text on a computer with a storage for receiving a character and a display for displaying said character in a font selected from a plurality of fonts stored in said storage in an indexed font table containing glyphs for each of said plurality of fonts, comprising the steps of:

(a) selecting a first font from said plurality of fonts stored in said storage;

(b) inputting into said computer a character code representative of a particular character;

(c) determining if said character is defined in said first font by accessing said indexed font table utilizing said character code as an index to determine if there is a first associated glyph for said first font, and if a first associated glyph is found, then displaying said character in said first font by displaying said first associated glyph on said display;

(d) selecting a second font based on a previously entered character displayed on said display when said first associated glyph is not found;

(e) searching said second font in said ordered font table utilizing said character code as an index to determine if there is a second associated glyph for said second font, and if a second associated glyph is found, then displaying said character by displaying said second associated glyph on said display; and (f) displaying a third associated glyph from a default font if said second associated glyph is not found.

* * * * *